United States Patent
Yung

(10) Patent No.: US 7,332,664 B2
(45) Date of Patent: Feb. 19, 2008

(54) SYSTEM AND METHOD FOR MUSICAL INSTRUMENT EDUCATION

(75) Inventor: Chi Wai Yung, Hong Kong (CN)

(73) Assignee: Ricamy Technology Ltd., Hong Kong (CN)

(*) Notice: Subject to any disclaimer, the term of this patent is extended or adjusted under 35 U.S.C. 154(b) by 320 days.

(21) Appl. No.: 10/906,749

(22) Filed: Mar. 4, 2005

(65) Prior Publication Data

US 2006/0196343 A1    Sep. 7, 2006

(51) Int. Cl.
G09B 15/00    (2006.01)
G09B 15/02    (2006.01)
G09B 15/04    (2006.01)

(52) U.S. Cl. ............. 84/470 R; 84/477 R; 84/483.1; 84/483.2; 84/609; 84/454

(58) Field of Classification Search ............ None
See application file for complete search history.

(56) References Cited

U.S. PATENT DOCUMENTS

| 5,952,597 | A | * | 9/1999 | Weinstock et al. ........... 84/609 |
| 6,066,791 | A | * | 5/2000 | Renard et al. ............ 84/477 R |
| 6,072,113 | A |   | 6/2000 | Tohgi et al. |
| 6,107,559 | A | * | 8/2000 | Weinstock et al. ............ 84/634 |
| 6,211,451 | B1 |  | 4/2001 | Tohgi et al. |
| 6,452,081 | B1 |  | 9/2002 | Ravagni et al. |
| 6,495,747 | B2 |  | 12/2002 | Shimaya et al. |
| 7,129,407 | B2 | * | 10/2006 | Hiratsuka et al. ............ 84/609 |
| 2002/0005109 | A1 | | 1/2002 | Miller |
| 2002/0046638 | A1 | | 4/2002 | Wright et al. |
| 2002/0157521 | A1 | | 10/2002 | Shahal |

FOREIGN PATENT DOCUMENTS

CA    2357291    9/2001

* cited by examiner

*Primary Examiner*—Marlon Fletcher
(74) *Attorney, Agent, or Firm*—Lee & Hayes, PLLC

(57) ABSTRACT

System and method for musical instrument education are provided. The system includes a lesson terminal which has a processor unit configured to evaluate performance musical data inputted from an electronic musical instrument, to enable a user feedback, and to enable determining new music training materials for a next lesson. The lesson terminal also has a data-receiving unit for receiving music training materials from an external music data source. The data-receiving unit may be a network connection port, such as an Internet connection port, for connecting to a server, or a local receiving port for connecting to a removable data storage. An electronic musical instrument and a method for evaluating performance musical data are also provided.

5 Claims, 14 Drawing Sheets

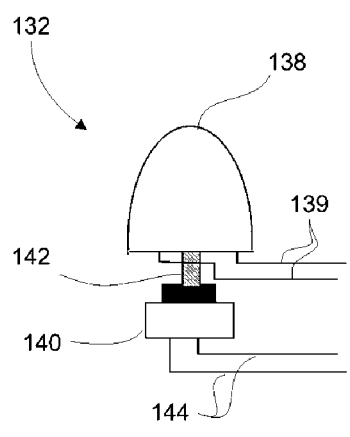
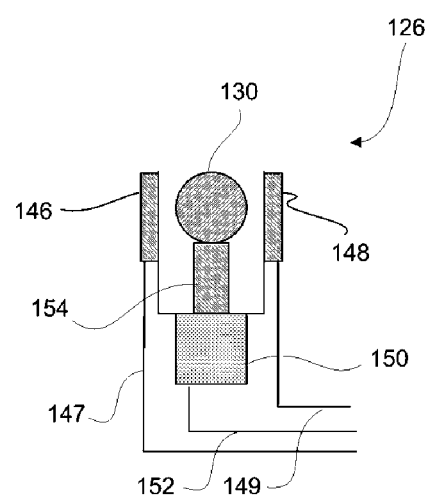
FIG. 7
FIG. 8

SYSTEM AND METHOD FOR MUSICAL INSTRUMENT EDUCATION

CROSS-REFERENCE TO RELATED APPLICATIONS

None.

BACKGROUND

1. Field of the Invention

The present invention relates generally to systems and methods for musical instrument education, and particularly to systems and methods for teaching students musical instrument skills without requiring a human tutor.

2. Description of the Prior Art

Musical instrument education is an important aspect in many societies. Although particularly common for parents to arrange their children to learn the skills of playing musical instruments, musical instrument education is not limited to a certain age group. There are a variety of ways for people to receive musical instrument education. Many schools offer musical instrument courses to teach students how to play a musical instrument. Specialty musical education schools also exist to train people on their skills to play musical instruments. In addition, people also learn how to play musical instruments through home schooling and individual tutoring.

According to the conventional methods for musical instrument education, typically a human tutor (or instructor) is involved. The student, and sometimes an accompanying person (often a parent if the student is a child), needs to commute to the location of the tutor or to where the teaching facility and musical instruments are provided. Alternatively, the tutor commutes to the location of the student. The cost is often high due to involvement of a paid tutor, expensive instruments and teaching facilities. Commuting not only incurs further expenses, but also can be difficult to do and time-consuming. In addition, lessons usually have fixed time schedules and may be difficult to arrange.

Remote education or learning by correspondence alleviates the above problems to a certain extent. However, many problems still exist. A human tutor or evaluator is still required. Remote education also creates its own problems. The student needs to mail recorded materials on a recording medium to the tutor or the evaluator for evaluation. After finishing evaluation, the tutor or the evaluator then needs to send the evaluation and instructions to the student. The process is indirect and can be slow.

The use of the Internet further helps to solve some of the problems. For example, instead of mailing materials recorded on a recording medium to the tutor, the student can record his or her performance musical data in a digital format and send it over to the tutor electronically. The tutor can also reply to the student electronically. Nevertheless, the process still requires a human tutor. The particular manners in which the existing musical instrument education systems and methods transmit electronic musical data also bring their own problems. For example, if the student uses a conventional musical instrument, the student will need to record his or her performance in a proper digital format that can be transmitted to the tutor. The digital files must also be readable by the tutor. Such recordings may not only be time consuming but also technologically challenging for many people. Furthermore, performance musical data tends to have large file sizes that can make data transmission slow and occupy large portions of bandwidth of the Internet connection. Especially, which limitations may make it difficult or impossible to have highly interactive training sessions which require frequent and quick performance-evaluation cycles.

It has also been proposed to use a computerized musical performance teaching system. One example is found in U.S. Pat. No. 6,072,113. These computerized performance teaching systems address some of the above problems but still leave much to be desired.

SUMMARY OF THE INVENTION

The invention addresses the above problems by providing systems and methods for musical instrument education with various inventive features.

The core of the system is a local lesson terminal, which includes a processor unit and data-receiving unit. The processor unit is configured to evaluate performance musical data inputted from an electronic musical instrument, to enable a user feedback, and to enable determining a training content for a next lesson. The data-receiving unit is for receiving new music training materials in the training content for the next lesson. In one embodiment, the data-receiving unit includes a network connection port, such as an Internet connection port, for connecting to a server. The processor unit transmits evaluation data to the server, and receives the new music training materials from the server to update the local lesson terminal. In one embodiment, the server is a remote database server having a central data storage storing a collection of musical lesson materials.

In another embodiment, the data-receiving unit includes a local connection port for connecting to a removable data storage.

The local lesson terminal may also include a data storage for storing teaching programs. The local lesson terminal may also have an instrument connection port for connecting to the electronic musical instrument. Alternatively, the electronic musical instrument may be an integral part of the local lesson terminal.

In some embodiments, the local lesson terminal receives a performance musical data from the electronic musical instrument and evaluates the performance of a user playing the musical instrument based on the performance musical data received. The local lesson terminal then enables a training content for a next lesson to be determined based on the performance of the user. If the training content for the next lesson requires new training materials which are not already present at the local lesson terminal, the new training material is received by the local lesson terminal at the data-receiving unit. For those embodiments in which the data-receiving unit is directly connected to a remote server, the local lesson terminal transmits musical performance evaluation data to the remote server, which then determines the training content for the next lesson. In some embodiments, the local lesson terminal does not need to transmit performance musical data to the server in order to evaluate the performance musical data. Instead, the local lesson terminal performs an evaluation within itself.

In one embodiment, the local lesson terminal is configured to send a feedback signal to the electronic musical instrument. The feedback signal may be used to perform several functions including demonstrating a prerecorded sample performance, indicating how to play a musical note, a group of musical notes, or a portion of a music score, illustrating a musical notation, or pointing out a performance error made by a user playing the electronic musical instrument.

In some embodiments, the local lesson terminal further has a display unit for displaying information to a user playing the electronic musical instrument. The display may be a computer screen, or a television set.

The local lesson terminal may also have an audio output device for generating sounds based on either data stored in the data storage or the performance musical data inputted from the electronic musical instrument.

The local lesson terminal may be contained in a single integrated unit. It may also be embodied in a personal computer system.

The invention also provides a method for musical performance evaluation. The method is used to compare performance musical data for a plurality of performed musical notes with model musical data for a plurality of model musical notes. The method first forms a plurality of alternative musical note match lineups. In each alternative musical note match lineup, each model musical notes is matched with one of the performed musical notes to form a pair unless a corresponding performed musical note has been identified as missing. The alternative musical note match lineups are different from one another by at least one pair of matching model musical note and performed musical note.

For each alternative musical note match lineup, the method calculates a set of note deviations, each note deviation being calculated from the data for one of the model musical notes and the data for the matching performed musical note. For each alternative musical note match lineup, the method then calculates an overall performance deviation of the performance musical data from the model musical data.

The method then selects an optimum musical note match lineup from the plurality of musical note match lineups based on the overall performance deviations, and evaluates against a preset criterion the overall performance deviation calculated from the optimum musical note match lineup.

The invention also provides an electronic musical instrument used for the musical instrument education systems and methods. The electronic musical instrument simulates a conventional musical instrument and outputs performance musical data. The electronic musical instrument includes a power supply, an input sensor, and a volume sensor. The electronic musical instrument also has a microcontroller for generating music based on signals from the input sensor and the volume sensor. An electronic musical instrument also has a connection port for connecting to a local lesson terminal of a musical instrument education system.

In some embodiments, the electronic musical instrument includes a feedback device. The feedback device can be controlled by the microcontroller based on controlling signals received from the musical instrument education system. The feedback device may generate a sound or a light to display of feedback signal.

In some embodiments, the electronic musical instrument has a string element to simulate a string instrument. In one embodiment, for example, the electronic musical instrument simulates a violin. In some embodiments, the electronic musical instrument further has a press button connected to the string element. The press button is switchably and electronically connected to the microprocessor, whereby when a related portion of the string element is pressed, the press button sends a signal to the microprocessor. In some embodiments, the electronic musical instrument has an LED connected to the string element. The LED is switchably and electronically connected to the microprocessor, whereby when a related portion of the string element is pressed, the LED is lit on as a feedback signal.

The systems and methods for musical education in accordance with the present invention do not require a human tutor and thus eliminate a significant factor among the causes of high costs, inconvenience and inflexibility in the conventional systems and methods. The systems and methods largely rely on a local lesson terminal as described which functions as a virtual musical lesson teacher, but also draw assistance from an external data source, such as a server that is separate from the local lesson terminal, or a removable data storage such as a cartridge. The external data source shoulders a significant burden of stored a large amount of materials which would have been on the local lesson terminal. A server, for example, can support multiple users using different local lesson terminals. A centralized server also makes data management and intellectual property (e.g., copyrights) management easier to perform. At the same time, the systems and methods do not require constant data communications between the local lesson terminal and the external data source. The systems and methods only require transmission of essential evaluation data and new lesson materials when needed. The burden on the network bandwidth is therefore significantly alleviated.

The systems and methods also provide an efficient scheme to evaluate musical performance of a user playing the musical instrument. Instead of performing simple note-by-note comparison and giving an error signal when a mistake has been made on a single note, the performance evaluation scheme of the present invention compares a group of performed musical notes with their corresponding model musical notes in a cohesive manner. The scheme is intelligent enough to detect missing notes or extraneous notes in the performed musical notes.

The systems and methods also provide an electronic musical instrument that simulates a variety of real musical instruments, and are not limited to be a keyboard type of instrument.

Other features and advantages of the invention will become more readily understandable from the following detailed description and figures.

BRIEF DESCRIPTION OF THE FIGURES

The present description of the systems and methods for musical education will be described in detail along with the following figures, in which like parts are denoted with like reference numerals or letters.

FIG. 7 is a schematic diagram showing details of press buttons of the electronic violin in one embodiment.

FIG. 8 is a cross-sectional view of one of the pressure sensor assemblies of the electronic violin.

DETAILED DESCRIPTION OF THE INVENTION

The present inventions provide systems and methods for musical education. Those skilled in the art will recognize that various features disclosed in connection with the embodiments may be used either individually or jointly.

Disclosed below are representative embodiments of the systems and methods for musical education in accordance with the present inventions. The representative embodiments are disclosed herein for purposes of illustrating. The disclosed systems and methods should not be construed as limiting in any way. Instead, the present disclosure is directed toward all novel and nonobvious features and aspects of the various disclosed embodiments, alone and in various combinations and subcombinations with one another. The methods are not limited to any specific aspect or feature or combinations thereof, nor do the disclosed systems and methods require that any one or more specific advantages be present or problems be solved.

Although multiple examples of embodiments have been disclosed, workers skilled in the art will recognize that changes may be made in form and detail without departing from the spirit and scope of the invention. Therefore, these and other variations upon the specific embodiments are intended to be covered by the present inventions.

The invention has three main aspects including (1) a musical instrument education system that includes a local lesson terminal, but can be configured to further include an electronic musical instrument and an external data source such as a remote music lesson server or a removable data storage; (2) an electronic musical instrument that is adapted to output performance musical data into the local lesson terminal and display feedback signals to a user; and (3) a method for performing a cohesive evaluation of a musical performance by the user.

These three main aspects of the invention are described below separately.

1. The Musical Instrument Education System

In the following disclosure, several exemplary embodiments of the musical instrument education system are described in FIGS. 1-4.

Figure 1:
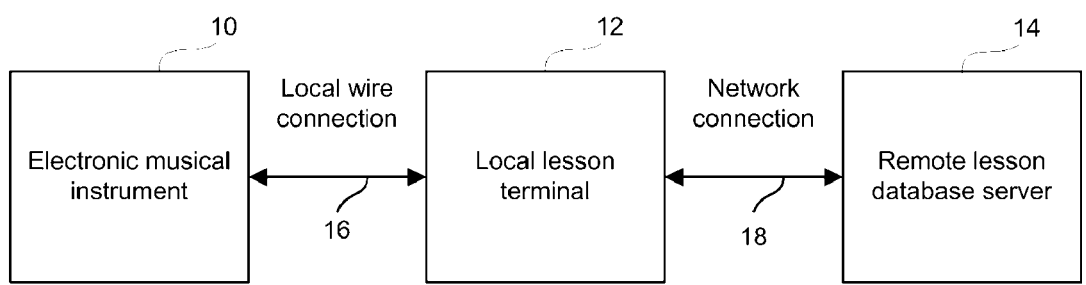
FIG. 1 is a block diagram of a system for musical instrument education in an exemplary embodiment of the present invention.

FIG. 1 is a block diagram of a system for musical instrument education in an exemplary embodiment of the present invention. The system includes an electronic musical instrument 10, a local lesson terminal 12, and a remote lesson database server 14. The electronic musical instrument 10 is connected to the local lesson terminal 12 by local wire connection 16. The local lesson terminal 12 is connected to the remote lesson database server 14 by network connection 18.

In one embodiment, the remote lesson database server 14 is a central server supporting multiple local lesson terminals. The central server stores the centralized data of music lessons, including music training materials, accessible over a network. The remote lesson database server 14 also receives evaluation data for the performance of a user during a lesson. In one embodiment, the remote lesson database server 14 determines the content of the user's next lesson based on the received evaluation data.

In some embodiments, the remote lesson database server 14 is accessible through the Internet. The remote lesson database server 14 may also act as a lesson log device to allow the user (or a parent of a young student) to check the progress of the musical instrument learning.

Because the server can be a remote database server having a large central data storage, it shoulders a significant burden of stored a large amount of materials which would have been on the local lesson terminal. The centralized server also makes data management and intellectual property (e.g., copyrights) management easier to perform.

At the same time, as will become clear with the descriptions below, the systems and methods do not require constant data communications between the local lesson terminal and the server. The systems and methods only require transmission of essential evaluation data and new lesson materials when needed. The burden on the network bandwidth is therefore significantly alleviated.

The details of the musical instrument 10 and the local lesson terminal 12 are described below.

To use the musical instrument education system, a user (student) plays a segment of music on the electronic musical instrument 10, which generates performance musical data based on the user's performance. The local lesson terminal 12 receives the performance musical data from the electronic musical instrument, and evaluates the performance of the player based on the performance musical data received. After a training session, the local lesson terminal 12 transmits an evaluation data to the remote lesson database server 14, which then determines a training content for a next lesson based on the performance of the user. The determination of a training content is made based on a preset criteria embodied in teaching programs. Alternatively, the local lesson terminal 12 instead of the remote lesson database server 14 determines the training content based on a preset criteria embodied in teaching programs installed on the local lesson terminal 12.

If the training content for the next lesson requires a new training material that is not already present at the musical instrument education apparatus, the new training material is subsequently sent from the remote lesson database server 14 to be received at the local lesson terminal 12. This can be done anytime when there is communications between the local lesson terminal 12 and the remote lesson database server 14, but is preferably performed at the beginning of a new lesson.

The local lesson terminal 12 also interactively instructs or demonstrates information to the user during the training session. Details of the system and method are given below.

Figure 2:
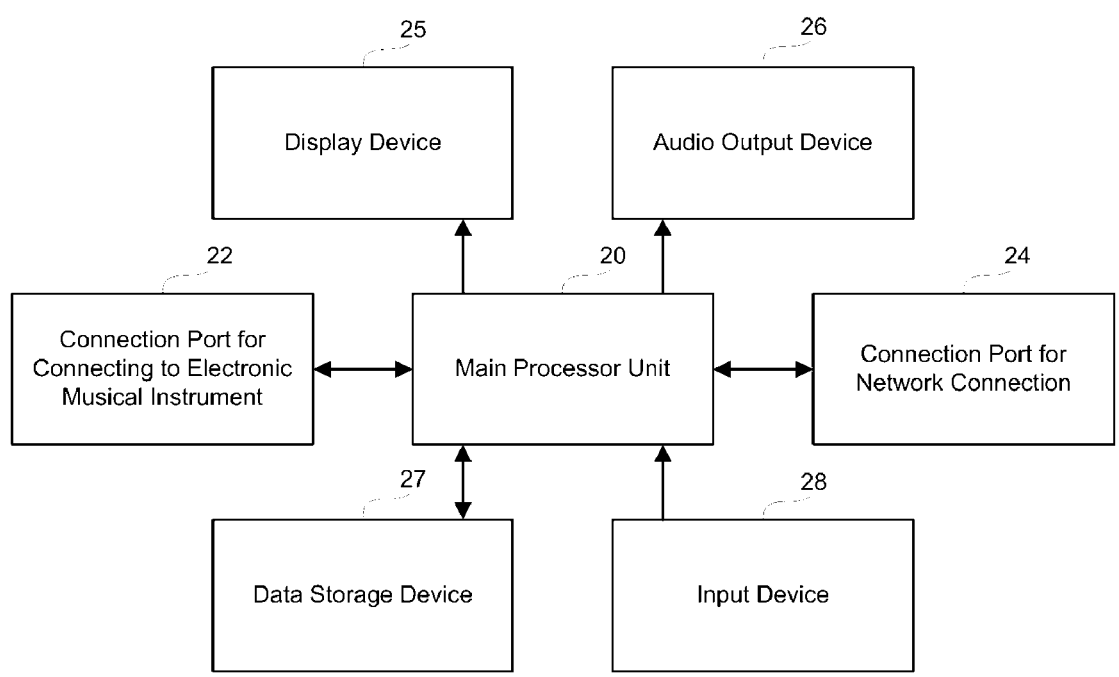
FIG. 2 is a block diagram of an exemplary embodiment of a local lesson terminal of the present invention.

FIG. 2 is a block diagram of an exemplary embodiment of the local lesson terminal 12. The exemplary local lesson terminal has a main processor unit 20, a instrument connection port 22 for connecting the main processor unit 20 to the electronic musical instrument 10, and a network connection port 24 for connecting the main processor unit of 20 to the remote lesson database server 14. The main processor unit 20 is used to execute musical lesson teaching software or programs installed on the local lesson terminal 12 and process performance data and user input data. The main processor unit 20 also helps to transfer data between the local lesson terminal 12 and the electronic music instrument 10, and transfer data between the local lesson terminal 12 and the remote database server 14. Through these data communications, the main processor unit 20 is used to enable a user feedback and to enable determining a training content for the next lesson. The network connection port 24 further serves as a data-receiving unit for receiving new music training materials from an external music data source, which in this particular embodiment is the remote lesson database server 14.

The exemplary local lesson terminal 12 in FIG. 2 further includes a display device 25, an audio output device 26, a data storage device 27 and an input device 28. The display device 25 is connected to the main processor unit 20 and is used to display lesson information. The audio output device 26 is connected to the main processor unit 20 and is used to provide audio feedback to the user. The data storage device 27 is connected to the main processor unit 20 and is used to store lesson data information. The input device 28 is also connected to the main processor unit 20 and is used for the user to input data to the main processor unit 20.

The exemplary embodiments described in FIGS. 1-2 above utilize a network connection (18) and a remote lesson database server (24) as an external music data source to feed and/or update the local lesson terminal 12 with music training (lesson) materials. It is envisioned that the external music data source can be a variety of other suitable forms. For example, instead of connecting the local lesson terminal 12 to a remote server through a network connection, the local lesson terminal 12 may contain a receiving port for a removable storage device. In such an exemplary embodiment, the receiving port, instead of the network connection port 24, serves as the data-receiving unit, while the removable storage device, instead of the remote lesson database server 14, serves as the external music data source. The removable storage device may be a cartridge, and the receiving port for the removable storage device may be a slot for receiving the cartridge. Plurality of such cartridges may be interchangeably used. The music training (lesson) materials are stored on the cartridges. The user can purchase cartridges pre-recorded with music training materials. Alternatively, the user can download appropriate music training materials using a separate device, such as an Internet enabled computer, and store them on an empty or erasable cartridge. It is further appreciated that many other forms of removable storage, including flash memory cards and CDs, may be used for this purpose.

Figure 3:
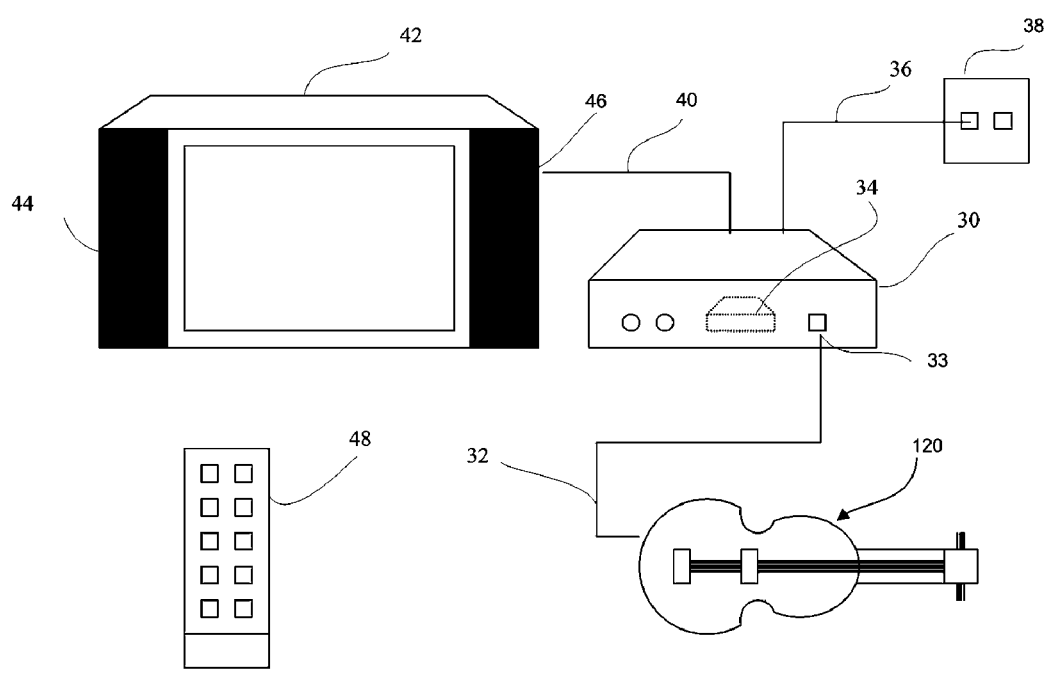
FIG. 3 is a schematic diagram of a musical instrument education system in an exemplary embodiment.

FIG. 3 is a schematic diagram of a musical instrument education system in an exemplary embodiment. In this embodiment, the electronic musical instrument is an electronic violin 120 which will be described in further detail below in connection to FIGS. 6-8. The electronic violin 120 is connected to an Internet set-top box 30 through a Universal Serial Bus (USB) connection wire 32 and a USB socket 33 built in the Internet set-top box 30. The Internet set-top box 30 has a built-in storage device 34. The Internet set-top box 30 is connected to the remote musical lesson database server 14 through a network wire 36 and a network port 38. The Internet set-top box 30 is also connected to a television (TV) set 42 through a connection cable 40. The television set 42 is used as a display unit. The television set 42 further has a pair of speakers 44 and 46 to output sound. An infrared remote control 48, which serves as an input device, is provided for the user to control the television set 42 and/or the Internet set-top box 30.

In this embodiment, the Internet set-top box 30 has a built-in microprocessor (not shown). With the built-in storage device 34 and other peripherals such as the network port 38 and the television set 42, the Internet set-top box 30 functions as a local lesson terminal. The music lesson teaching software or programs can be installed on the set-top box 30 and stored in the built-in storage device 34. Because the set-top box 30 across the teaching software or programs, the infrared remote control unit 48 may be programmed to control or input data to the teaching software or programs.

The storage device 34 can be a hard disk drive or any other type of storage device suitable for storing data and allowing quick access by the microprocessor built in the Internet set-top box 30. The USB port 33 and USB connection cable 32 can be replaced by any other device connection protocol (such as IEEE 1394 FireWire, or a wireless connection protocol) that is suitable for data communications between the Internet set-top box 30 and the electronic violin 120.

The network connection through the network cable 36 and the network port 38 can be an Ethernet connection or any other suitable network connections. The connection to the Internet can either be through an LAN connection routed to an Internet connection or a direct Internet connection through a modem such as a dial-up modem, a DSL modem, or a cable modem. The network connection may also be established through a wireless LAN connected to a wired Internet or a direct wireless Internet connection.

Figure 4:
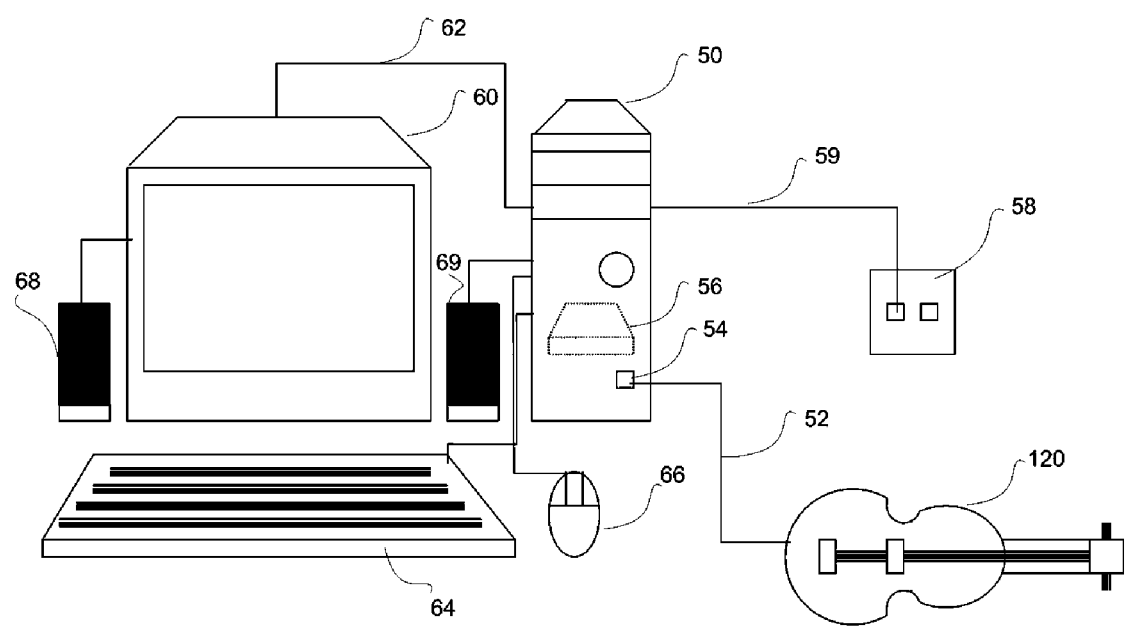
FIG. 4 is a schematic diagram of the musical education system in another exemplary embodiment.

FIG. 4 is a schematic diagram of the musical education system in another exemplary embodiment. In this embodiment, the electronic musical instrument is likewise the electronic violin 120. The electronic violin 120 is connected to a personal computer 50 through a Universal Serial Bus (USB) connection wire 52 and a USB socket 54 built in the personal computer 50. The personal computer 50 has a built-in a hard disk drive 56. The personal computer 50 is connected to the remote musical lesson database server 14 through a network wire 59 and a network port 58. The personal computer 50 is also connected to a computer monitor 60 through a video connection cable 62. The computer monitor 60 is used as a display unit. A keyboard 64 and a mouse 66, which serve as input devices, are provided for the user to control the personal computer 50 which runs the music lesson teaching software. The personal computer 50 is further connected to a pair of speakers 68 and 69 to output sound.

Although in the exemplary embodiments shown in FIGS. 3-4 the local lesson terminal 12 includes more than one separate components, it is appreciated that the local lesson terminal 12 can be contained in a single integrated unit. The local lesson terminal 12 can be further integrated with the electronic musical instrument 10 (e.g., the electronic violin 120 in FIG. 3). With this integration, the user may simply connect the music instrument 10 (and the built-in local lesson terminal 12) to a suitable display (e.g., the television set 42) using an AV cable and start the music training session immediately.

As is in the exemplary embodiment of FIG. 3, the USB connection (52 and 54) between the electronic violin 120 and the personal computer 50 can be replaced by any of a suitable device connection protocol. The network connection (58 and 59) can be any suitable type of network connections.

As will be clear with the further descriptions given below, the musical instrument education system of the present invention can be configured to evaluate performance musical data inputted from the electronic musical instrument automatically without assistance of a human instructor. The system can also be configured to evaluate the performance musical data were then the local lesson terminal, thus does not require transmitting the performance musical data to the server. In one embodiment, the musical instrument education system is configured to transmit evaluation data only but not performance musical data to the server. In another embodiment, the musical instrument education system is configured to receive musical lesson data only at a beginning of a training session.

As shown in the exemplary embodiments of FIGS. 1-2, the communication between the electronic musical instrument 10 and the local lesson terminal 12 is a two-way communication. The musical instrument education system can thus be configured to send a feedback signal to the electronic musical instrument 10, as well as to receive performance musical data from the electronic musical instrument 10. As will be shown in the further details described below, the feedback signal can be used to demonstrate a prerecorded sample performance, indicate how to play a musical note, a group of musical notes or a portion of a music score, illustrate a musical notation, or point out a performance error made by a user playing the electronic musical instrument.

The musical instrument education system thus functions as a virtual music teacher enhanced by an automated online library. The instructions, feedback signals and content of the music lessons are visually and/or acoustically displayed at the local lesson terminal. The user follows the instructions given by the virtual music teacher at the local lesson terminal 12. The local lesson terminal 12 learns the performance of the user by evaluating the user's performance data sent from the electronic musical instrument 10. Based on this knowledge, the local lesson terminal 12 adjusts the content and difficult level of the lesson. The local user terminal 12 also gives practical advices to the user so that the user can solve practice in a proper way even after a lesson. The local lesson terminal 12 summarizes the user's performance during the lesson and sends the evaluation data to the remote musical lesson database server 14. The database server 14 then generates the content of the next lesson to be downloaded by the local lesson terminal 12 in the next lesson.

2. Electronic Musical Instrument

The electronic musical instrument used in the musical instrument education system in accordance with the present invention is described in connection with FIGS. 5-8 below.

The musical education system of the present invention requires an electronic musical instrument for the user to practice and to feed performance musical data to the local lesson terminal for evaluation. In general, any musical instrument that can output a signal capable of being received and processed by the local lesson terminal can be used in the musical education system of the present invention. The output signal may either be analog or digital, depending on the signal receiving and processing capabilities of the local lesson terminal. However, because the main processor unit (20 in FIG. 2) of the local lesson terminal is preferably a digital processor, the local lesson terminal must either receive a digital signal from the electronic music instrument, or be able to convert an analog signal into a digital signal that can be processed by the main processor unit of the local lesson terminal.

An exemplary electronic music instrument suitable for the musical education system of the present invention has a Musical Instrument Digital Interface (MIDI). Conventional MIDI electronic musical instruments are often keyboarded musical instruments. With the help of electronic synthesizing techniques, these MIDI keyboards can generate sounds that simulate the sounds of a variety of musical instruments, such as piano and even stringed instruments. However, the physical operation of these MIDI keyboards at best simulates that of a piano (or another keyboarded instrument) but not of all instruments, particularly stringed instruments such as a violin. Conventional MIDI keyboards therefore may not be suitable for practicing some of the popular musical instruments.

The present invention provides an electronic musical instrument that can simulate many real musical instruments. Although the shapes and properties of electronic musical instruments may be different, the concepts disclosed herein can be applied to make a variety of electronic musical instruments such as violin, viola, flute, oboe, clarinet, etc.

Figure 5:
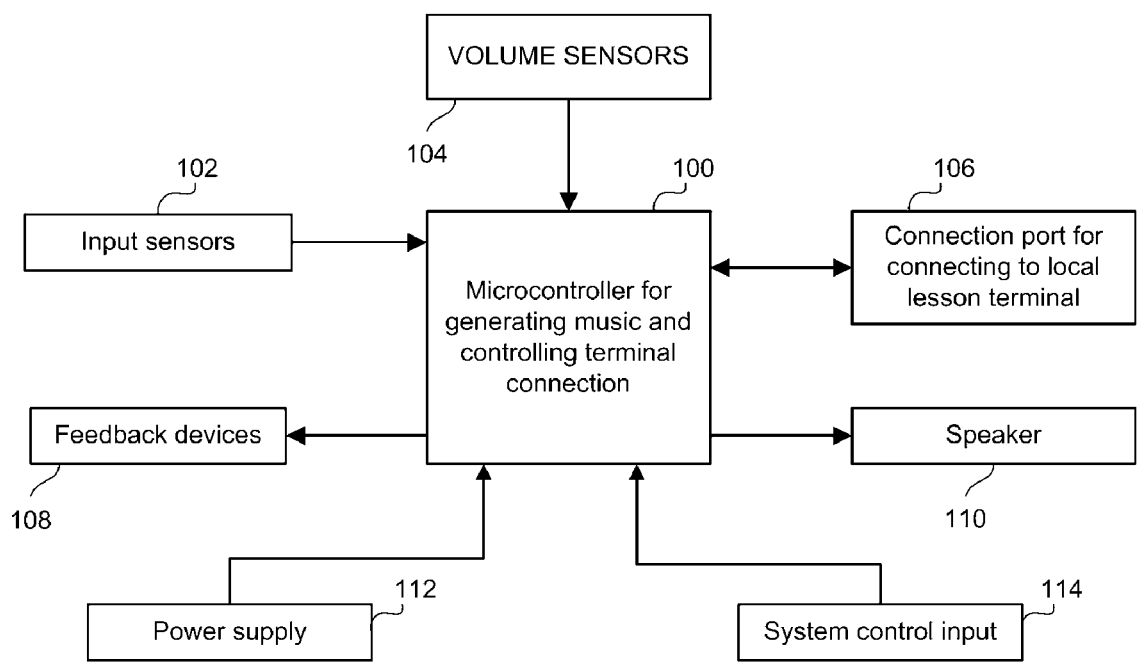
FIG. 5 is a block diagram of an exemplary embodiment of the electronic musical instrument.

FIG. 5 is a block diagram of an exemplary embodiment of electronic musical instrument 10. The core of the electronic musical instrument 10 is a microcontroller 100 for generating music and controlling terminal connections and other peripherals. The microcontroller 100 is connected to input sensors 102, volume sensors 104, a connection port 106, feedback devices 108, a speaker 110, a power supply 112, and a system control input 114.

The user generates an input signal through input sensors 102 and volume sensors 104. The microcontroller 100 analyzes the input signal and generates a music sound through the speaker 110. At the same time, the microcontroller 100 formulates musical performance data based on the user's input signal and sends the musical performance data to the local lesson terminal 12 (if connected) through the connection port 106. The musical data can either be an analog signal or a digital signal, depending on the data processing compatibility and capabilities of the local lesson terminal 12. The protocol of the connection between the electronic musical instrument 10 and the local lesson terminal 12 can be any open protocol, e.g. Universal Serial Bus (USB), IEEE 1394, etc., or a proprietary protocol.

In one embodiment, feedback devices 108 can be enabled or disabled through the system control input 114. Alternatively, the feedback devices 108 can be enabled or disabled at the local lesson terminal 12 if connected through the connection port 106. If the feedback devices 102 are enabled, the microcontroller 100 sends signals to the feedback devices 102 to give necessary feedback information to the user.

The feedback signals can be sent to the feedback devices 108 through either the system control input 114 or through the local lesson terminal 12, or both. For example, in addition to generating music tones through speaker 110, the local lesson terminal 12 can be configured to instruct the microcontroller 100 to display feedback information to the user through the feedback devices 108.

The power supply 112 can be an AC power supply or a battery power supply such as a battery box.

Figure 6:
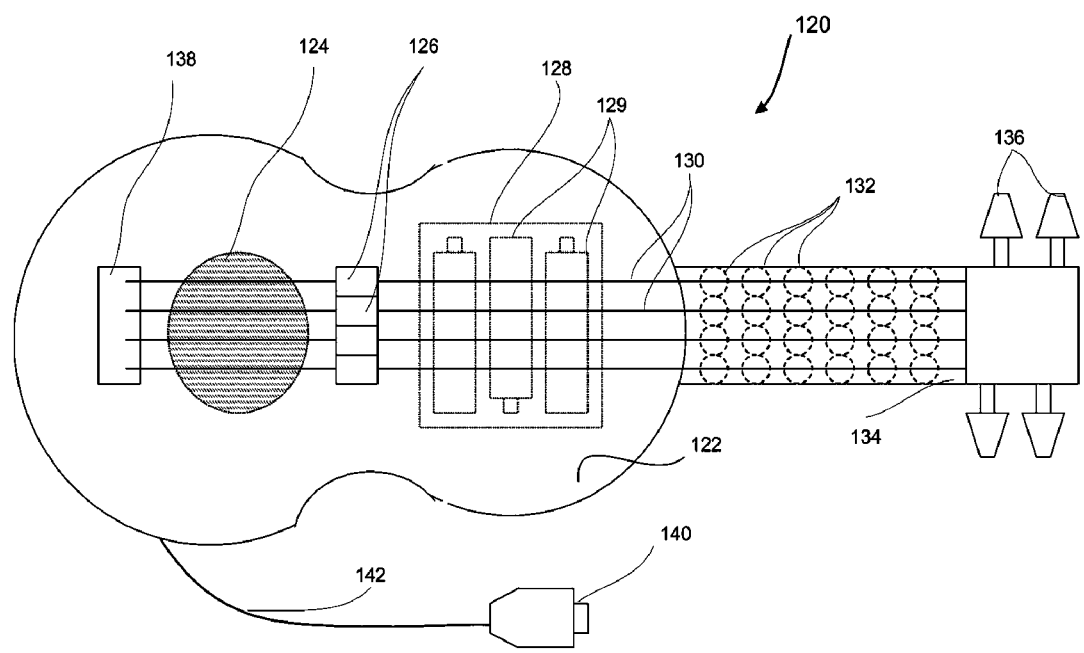
FIG. 6 is a schematic diagram of an electronic violin in an exemplary embodiment.

FIG. 6 is a schematic diagram of an electronic violin 120 in an exemplary embodiment. The electronic violin 120 has a body 122, which is an equivalent of a soundboard of a real violin but is less critical than the soundboard of a real violin, because the electronic violin 120 has a speaker 124 to generate sounds instead of relying on acoustic residence of the soundboard (the body 122). Placed within the body is a battery box 128 to supply power to the electronic violin 120. The battery box 128 may contain a plurality of batteries 129. Various types of batteries may be used. In the middle section of the body 122, and on a top surface thereof, is a plurality of pressure sensor assemblies 126, the details of which are described below in relation to FIG. 8. The pressure sensor assemblies 126 function as volume sensors. A plurality of strings 130 run through the sensor assembly 126. The strings 130 are arranged in a manner similar to that of a conventional violin.

The electronic violin 120 also has a fingerboard 134, which hosts a plurality of press buttons 132. The press buttons 132 function as input sensors (i.e., embodiments of input sensors 102 in FIG. 5). The press buttons 132 are attached on a top surface of the fingerboard 134. The strings 130 run across and over the press buttons 132 such that when the user presses a portion of one of the strings 130, one or more press buttons 132 near to the pressed string portion will also be pressed down.

The electronic violin 120 also has a plurality of control buttons 136 located beyond the fingerboard 134 near the scroll portion. The control buttons 136 are used by the user to perform system adjustment and other operations such as turning on and off the electronic filing 120, resetting the electronic violin 120, changing the mode of the electronic violin 120 (e.g., from playing mode to teaching mode, or vice versa), and tuning the strings 130.

The electronic violin 120 also has a microcontroller (not shown) or a combination of several microcontrollers located within the body 122 near location 138 for sound generation and/or data transportation. The microcontroller is connected to a connection port 140 through a connection wire 142. The connection port 140 further connects to the local lesson terminal 12. The connection port 140 is preferably a USB connector if the microcontroller supports Universal Serial Bus (USB) connections. A suitable microcontroller, or a set of microcontrollers desirably, should be able to handle all or most user inputs, volume inputs, feedback devices and music tone generation. An exemplary microcontroller for sound generation is sold by Sunplus Technology Co. Ltd. of Taiwan, under model number SPFA16. An exemplary microcontroller for USB communication is sold by Cypress Semiconductor Corporation of United States of America, under model number CY7C63723. Microcontrollers SPFA16 and CY7C63723 together can handle both sound generation and USB connections between the electronic violin 120 and local lesson terminal 12.

FIG. 7 is a schematic diagram showing details of the press buttons 132 in one embodiment. The press button 132 has an LED 138 which is connected to the microprocessor through wires 139. Because one of the strings 130 (not shown in FIG. 7) runs across the LED 138 and is in contact therewith, when the user presses the string 130, the user will also press the LED 138. Alternatively, the user may press the LED 138 directly. The LED 138 is connected with a press key 140 by a small plastic piece 142. The press key 140 is connected to the microcontroller through wires 144. When the user presses on the LED 138, the LED 138 pushes down the press key 140, thus sending a press signal to the microcontroller through wires 144. The press buttons 132 thus function as input sensors (102 in FIG. 5).

The signals generated by the press buttons 132 allow the microcontroller to determine key setting, pitches or tune settings of the electronic violin 120. The press buttons 132 thus simulate the functions of the peg box (including tuning pegs and nut) of a real violin.

At the same time, the LED 138 doubles as a feedback device. The microcontroller generates signals and feed them back to the LED 138 which will be turned on or off accordingly, so that user can get feed back information from the LED 138.

A real violin does not generate a music tone if only a string is pressed and pushed. A real violin generates sound only when a bow is pressed and pulled/pushed on the string. As described below, the electronic violin 120 has pressure sensor assemblies 126 to simulate this property.

FIG. 8 is a cross-sectional view of one of the plurality of pressure sensor assemblies 126. The pressure sensor assembly 126 is an integrated sensor that functions both as a volume sensor (104 in FIG. 5) and a directional sensor as described below.

The pressure sensor assembly 126 has a left contact plate 146 and a right contact plate 148, both of which are touch sensors. The left contact plate 146 and the right contact plate 148 face each other to form a channel therebetween. The channel is slightly wider than the wire 130, which runs through the channel. When the user presses, pulls or pushes the bow on the string 130, the string 130 will touch either the left contact plate 146 or the right contact plate 148. The left contact plate 146 and the right contact plate 148 are touch-sensitive. When touched by the string 130, the left contact plate 146 or the right contact plate 148 sends a signal to the microcontroller through wires 147 and 149, respectively. This allows the electronic violin 120 to sense the direction of the bow movements made by the user on the strings 130.

The pressure sensor assembly 126 also has a pressure sensor 150 connected to the microcontroller through a wire 152. Between the pressure sensor 150 and the string 130 is a connector piece 154. When the user pulls or pushes the bow on the string 130, the bow also presses the string 130. When the bow presses the string 130, the pressure exerted on the string 130 is transferred to the pressure sensor 150 through the connector piece 154. The pressure sensor 150 captures the value of the pressure force exerted by the bow and generates a pressure signal with an amplitude proportional to the amount of pressure exerted on the string 130. Because the amount of pressure is directly proportional to the volume of the tones to be generated, the pressure signal is also proportional to the volume of the tones to be generated. The pressure signal is transmitted to the microcontroller through wire 152.

The three touch sensors (the left and the right contact plates 146 and 148 and the pressure sensor 150) together allow the pressure sensor assembly 126 to detect both the direction and the strength of the bow movements, and to generate directional signals and volume signals.

Using the press buttons 132 and the pressure sensor assemblies 126, the electronic violin acquires information for the key (pitch or frequency), volume and direction data to generate music tones.

After receiving the key, volume and the direction signals, the microcontroller processes them to formulate key, volume and direction data. The microcontroller then sends the key, volume and direction data to the local lesson terminal 12.

In addition to the above-described manual operations by the user, the electronic violin 120 can also be controlled by the local lesson terminal 12. To do this, the lesson terminal 12 sends musical tone data to the electronic violin 120 through USB connection port 140. When the microcontroller of the electronic violin 120 receives the musical tune data from the local lesson terminal 12, it generates requested tones and/or feedback signals. Using this feature, the local lesson terminal 12 can show the preferred performance to the user by the electronic violin 120.

3. Method for Performing a Cohesive Evaluation of a Musical Performance

In order to teach a user to play a musical instrument, it is necessary to evaluate the quality of the performance of the user. Some existing evaluation methods compare the performance of the user with the model music on a note-by-note basis. That is, for every music note the user has played, the evaluation method compares the played music note with the model music note. The deviations are measured and an evaluation made based on a preset standard.

One problem with the above straightforward note-by-note method is that the evaluation may be thrown off if the user misses a music note or played an extraneous music note. If unable to detect such an error, the method may compare the played music notes with wrong model music notes. The result is an evaluation that would indicate a level of error or deviation much greater than it would be if the missed note or the extraneous note had been identified and skipped for matching and comparison. If the user practices a segment of music having a group of notes, missing a single note or playing one extraneous note may result in a non-meaningful evaluation and thus frustrate the practice process.

The invention provides a method for musical performance evaluation. The method cohesively compares performance musical data with model musical data for a plurality of musical notes. The method first forms a plurality of alternative musical note match lineups. In each alternative musical note match lineup, as many as possible model musical notes are matched with the performed musical notes. Each model musical notes is matched with one of the performed musical notes to form a pair unless a corresponding performed musical note has been identified as missing. The alternative musical note match lineups are different from one another in at least one pair of matching model musical note and performed musical note.

For each alternative musical note match lineup, the method then calculates a set of note deviations. Each note deviation is calculated from the data for one of the model musical notes and the data for the matching performed musical note.

For each alternative musical note match lineup, the method then calculates an overall performance deviation of the performance musical data using the set of note deviations just calculated.

The method then selects an optimum musical note match lineup from the plurality of musical note match lineups based on the overall performance deviations, and evaluates against a preset criterion the overall performance deviation calculated from the optimum musical note match lineup.

The method therefore offers a cohesive evaluation of user performances.

In one embodiment, after the user has played a group of music notes, the evaluation method tries to match the played music notes with the model musical notes (e.g., a segment of an original music score) by performing alternative matches described above. The method can find the correct matching between the played musical notes and the model musical notes even if there are extra notes or missed notes, or inaccurate notes played by the user. The evaluation method then decides whether critical errors have occurred. Such critical errors may be indicated by persistent incorrect notes, which may be due to a reason that the user has misinterpreted the key signature of the music score, and persistent incorrect amplitude, which may be due to a reason that user has overseen a amplitude symbol on the music score. If a critical error has occurred, the system will point it out and ask user to replay again. The system may check for critical errors in real-time when a certain batch of notes is played continuously.

The evaluation method is further illustrated below. Assuming the user attempted to play a group of the model musical notes $N_1, N_2, N_3 \ldots N_{n-1}$ and $N_n$, and generated a batch of performed music notes $N'_1, N'_2, N'_3 \ldots N'_{n-1}$ and $N'_n$. For every alternative musical note match lineup, an error score (deviation) between the performed musical notes and the model musical notes is calculated using the following formula:

$$\text{Error Score} = \Sigma\{A \times |F(N_i) - F(N'_i)| + B \times |D(N_i) - D(N'_i)| + C \times |A(N_i) - A(N'_i)|\}$$

where $F(N_i)$=frequency of the $i^{th}$ model music note;

$F(N'_i)$=frequency of the model music note that is selected to match the $i^{th}$ model music note;

$D(N_i)$=duration of the $i^{th}$ model music note;

$D(N'_i)$=duration of the model music note that is selected to match the $i^{th}$ model music note;

$A(N_i)$=amplitude of the $i^{th}$ model music note;

$A(N'_i)$=amplitude of the model music note that is selected to match the $i^{th}$ model music note;

A=Scale factor in calculating error score using deviation in frequency;

B=Scale factor in calculating error score using deviation in duration; and

C=Scale factor in calculating error score using deviation in amplitude.

For a model music note $N_i$, a different musical note match lineup may assign a different performed musical note $N'_i$ to match it. Different musical note match lineups therefore would normally have a different Error Score calculated using the above formula. The musical note match lineup that has the lowest error score is presumed to be the "correct match" or an optimum match lineup.

For example, if the user has played an extra note $N'_3$ and missed playing a note for the model note $N_7$, the evaluation system will be able to identify the correct match (in which $N'_3$ is omitted from the performed notes and a matching is given up for the model note $N^7$) because the evaluation system is able to find that this particular match lineup has the lowest error score.

The correct match will have a note match lineup as follows:

$N'_1 = N_1$, $N'_2 = N_2$, ($N'_3$ is omitted), $N'_4 = N_3$, $N'_5 = N_4$, $N'_6 = N_5$, $N'_7 = N_6$, none=$N_7$, and $N'_8 = N_8$ (and back to normal for all subsequent notes), etc.

If the evaluation method fails to consider and select the above match lineup, the error score would be very high as the frequency, duration and amplitude are not properly matched.

Using the above evaluation method, the system compares the user's performance music data and the model music data intelligently. In other words, the system compares "apples to apples."

4. Methods of Applications

Exemplary methods for applying the musical instrument education system are described below in connection to flowcharts in FIGS. 9-10, 11A, 11B, 11C, 12A and 12B.

Figure 9:
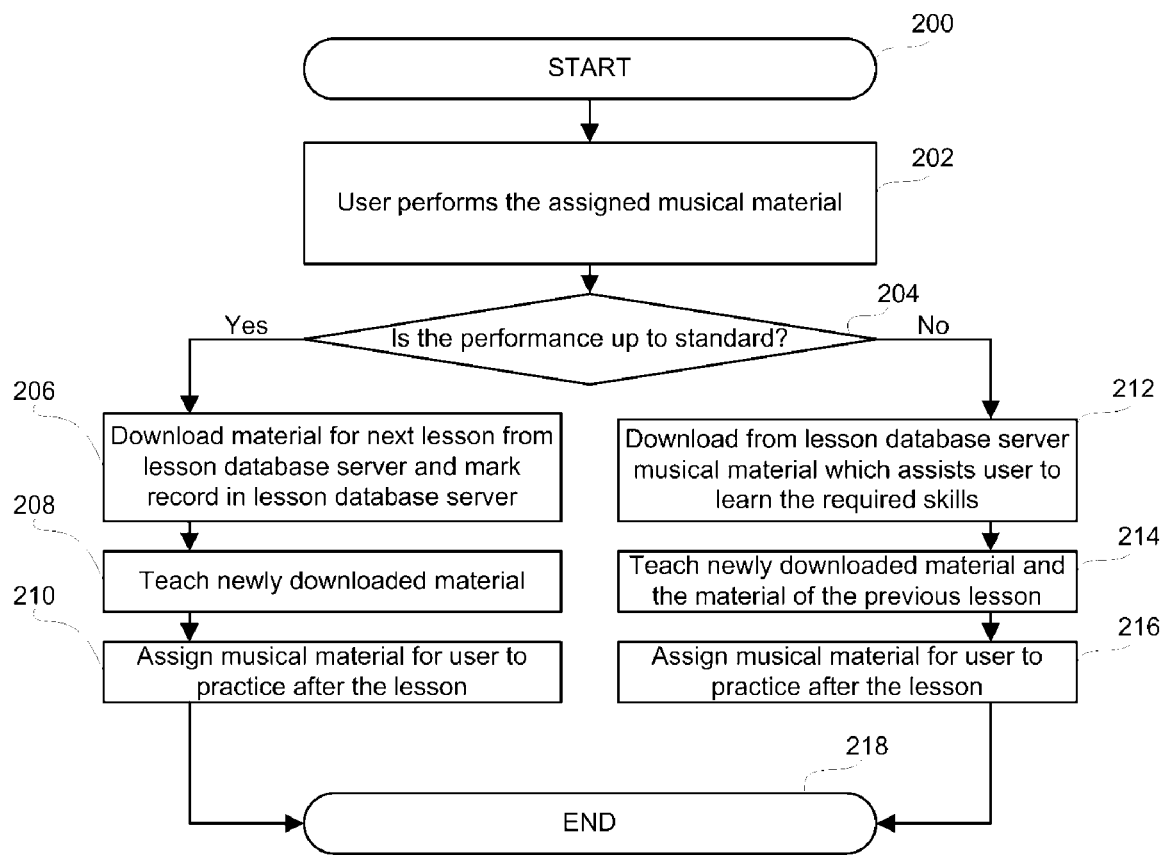
FIG. 9 is a flow chart of a lesson session using the musical instrument education system in an exemplary embodiment.

FIG. 9 is a flow chart of a lesson session using the musical instrument education system in an exemplary embodiment. The learning process starts in step 200. In step 202, the user first performs the assigned musical materials using the musical instrument education system described above (e.g., FIGS. 1-2). The system receives the performance musical data of the user from the electrical musical instrument 10 and evaluates the performance musical data. In step 204, the system judges whether the performance is up to a standard. If yes, the lesson proceeds to step 206 in which the system downloads new materials for the next lesson from the lesson database server 14.

If the lesson database server 14 is keeping a log of the user's progresses in learning, the lesson database server 14 also marks a record of the user's activity in step 206.

In step 208, the system teaches the user the newly downloaded material. In step 210, the system assigns additional musical materials for the user to practice after the lesson session. The session ends in step 218.

If in step 204 the system has decided that the user's performance is not up to the standard, the lesson proceeds to step 212 in which the system downloads from the lesson database server 14 musical materials which assist the user to learn the required skills. In step 214, the system teaches the user the newly downloaded materials and the materials of the previous lesson which the user has not performed satisfactorily. In step 216, the system assigns additional musical materials for student to practice after the lesson. The lesson session again ends in step 218.

Figure 10:
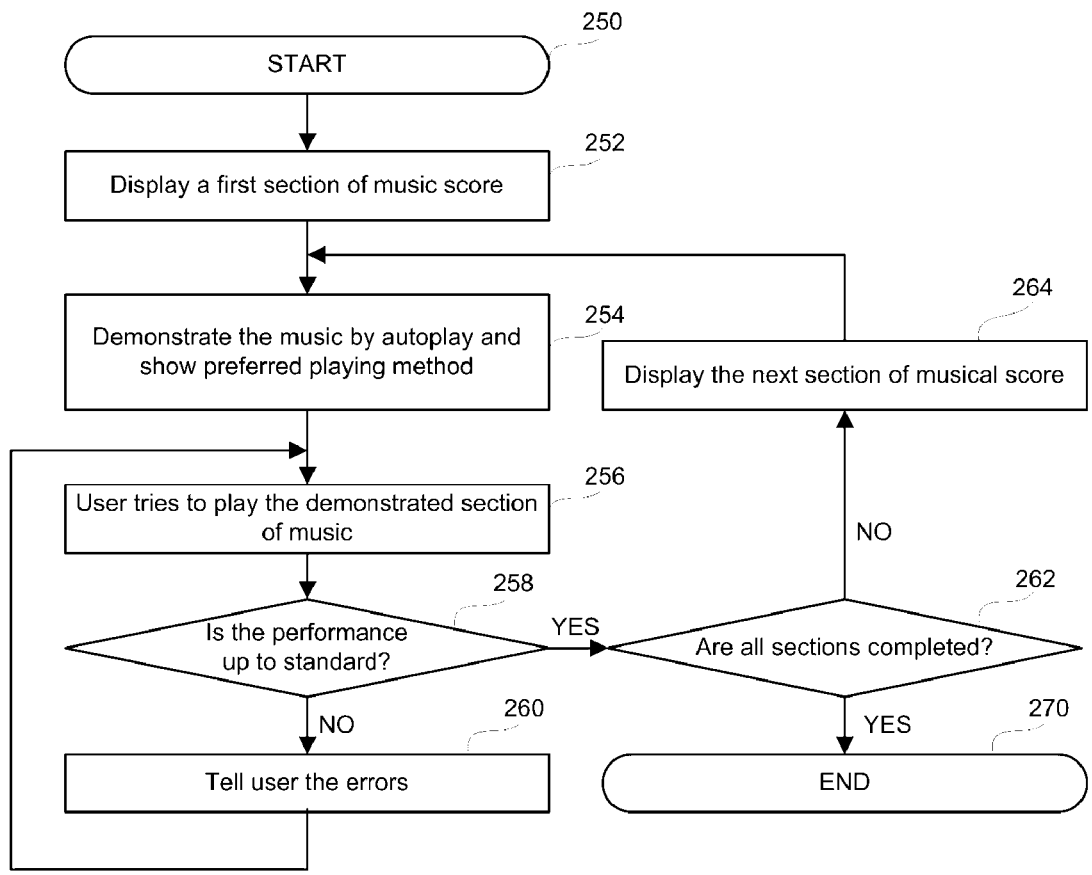
FIG. 10 is a flow chart of a procedure instructing a user on how to practice a music score using the musical education system described above.

FIG. 10 is a flow chart of a procedure instructing a user on how to practice a music score using the musical education system described above. The process starts in step 250. In step 252, the system displays a first section of the music score on display device 25 (FIG. 2). The selections of sections of a music score may be either pre-reformulated or manually made by the user. In step 254, the system demonstrates the selected a section of the music score by auto-playing the section. The music may be played either on audio output device 26 of the local lesson terminal using prerecorded data, or on the speaker 110 (FIG. 5) of the electronic music instrument 10 instructed by the local lesson terminal 12. In the same step 254, the system may also show the user the preferred playing method either on the display device 25 of the local lesson terminal 12, or directly on the feedback devices 108 (FIG. 5) of the electronic musical instrument 10.

In step 256, the user tries to play the demonstrated section of music of the electronic musical instrument 10. In step 258, the system receives the user's performance data, evaluates the user's performance and judges whether the performance is up to the standard. If not, the system tells the user the errors either through the feedback devices 108 of the electronic musical instrument 10 or the display device 25 of the local lesson terminal 12. The process then goes back to step 256 to allow the user to play again.

If in step 258 the system has judged that the user's performance is up to the standard, the process proceeds to step 262 in which the system surveys whether all the sections of the music score have been completed. If not, the process proceeds to step 264 to display the next section of the music score. The process then move to step 254 where the same process for demonstrating and practicing a section of the music score is repeated for the next section of the music score.

If in step 262 the system determines that all the sections of the music score have been completed, the process ends in step 270.

Figure 11A:
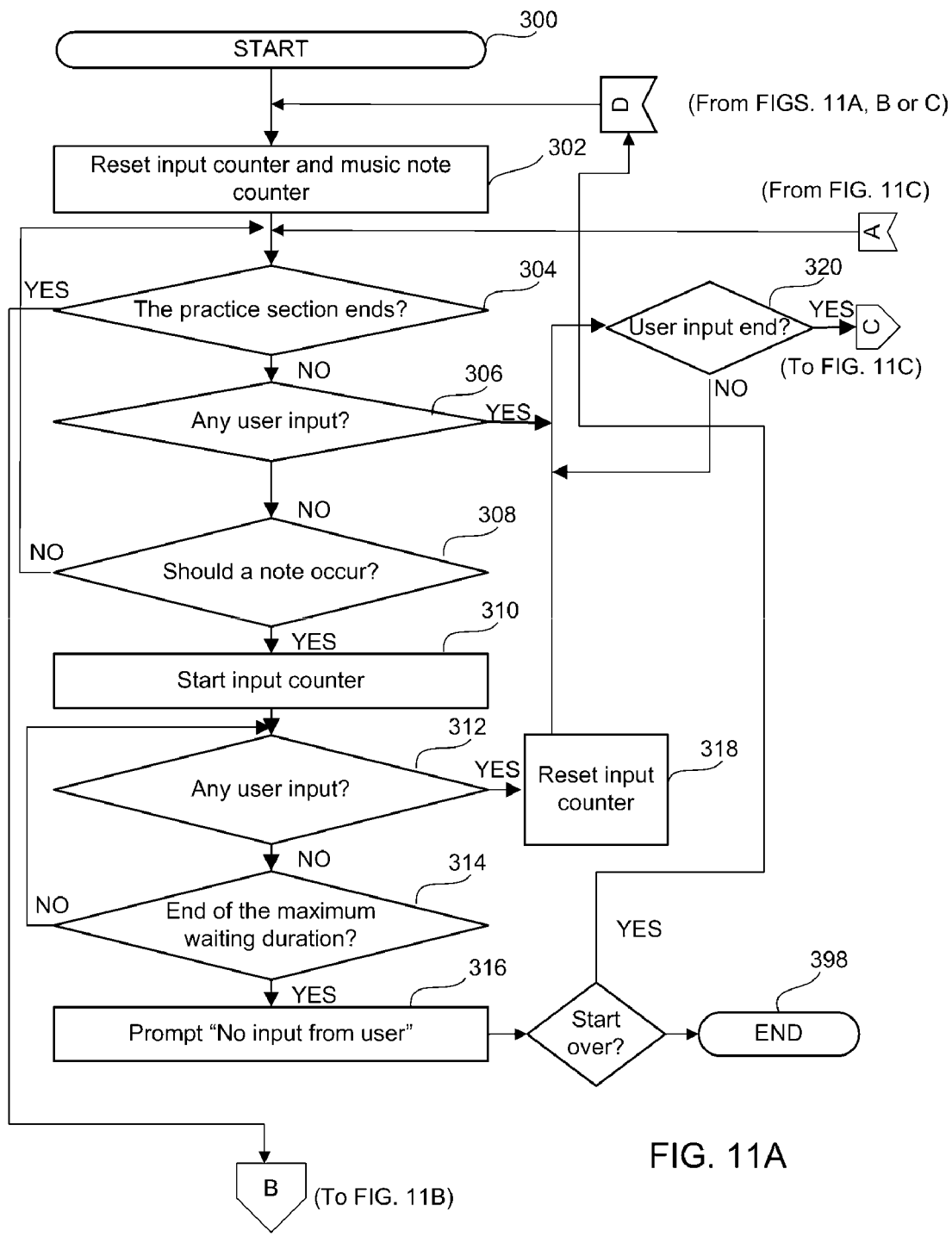
FIGS. 11A, 11B and 11C together are a flow chart of a program teaching a user to play a music score (e.g., a song) using the musical education system in an exemplary embodiment.
Figure 11B:
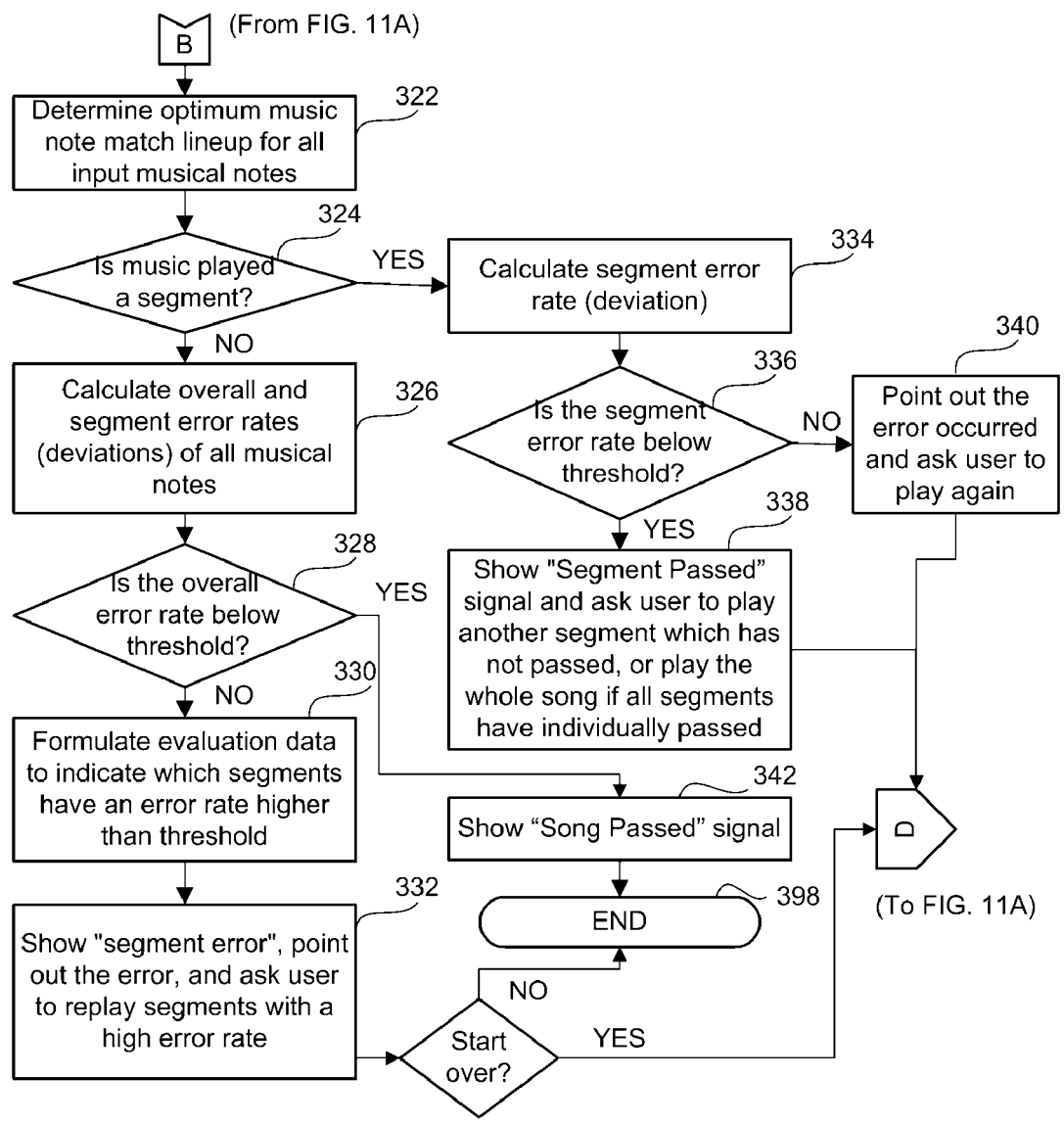
Figure 11C:
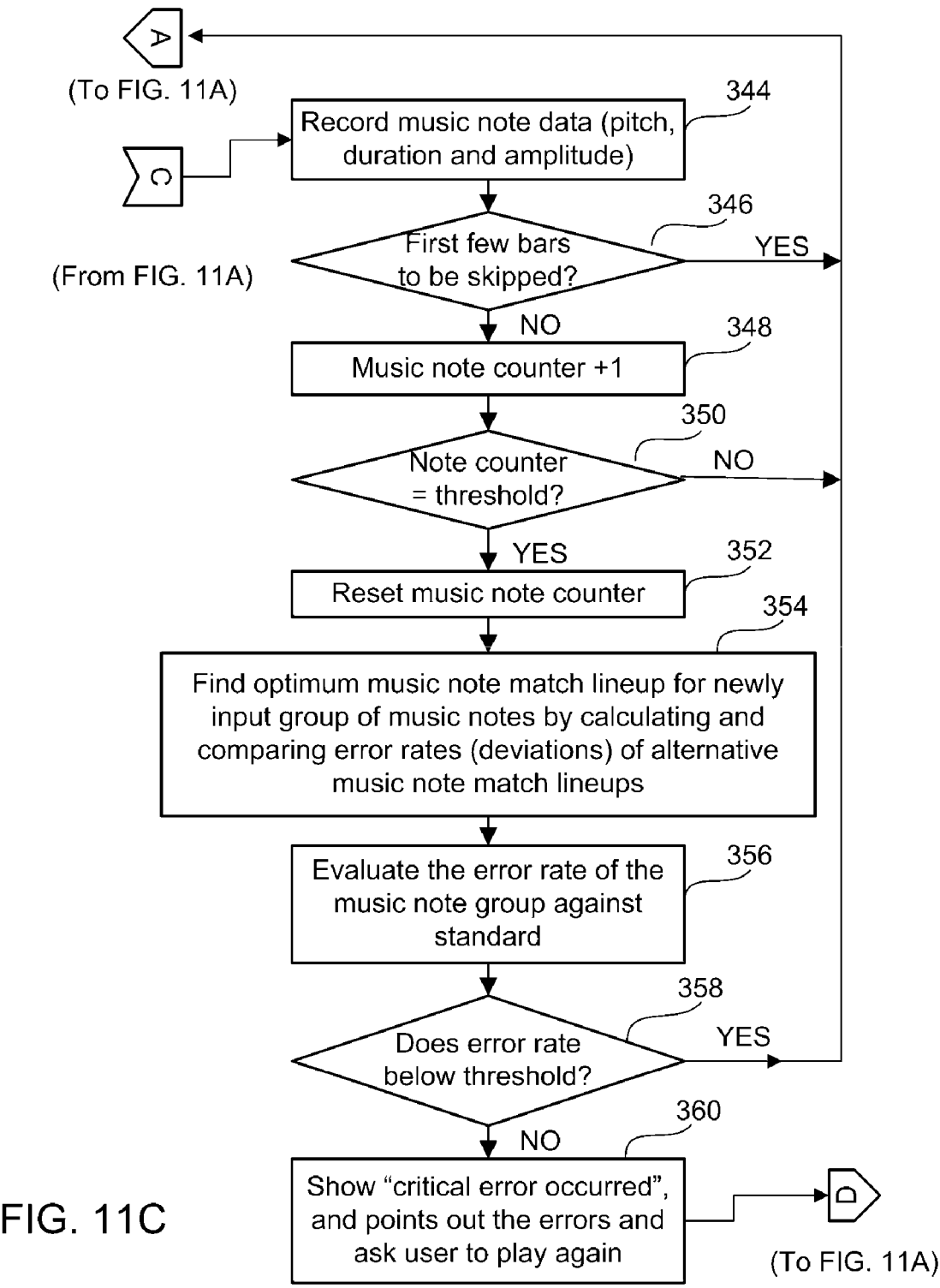

FIGS. 11A, 11B and 11C together show a flow chart of a program teaching a user to play a music score (e.g., a song) using the musical education system in an exemplary embodiment.

The process begins in step 300 in FIG. 11A. In step 302, the system first resets the input counter and the music note counter. In step 304, the program queries whether the section being practiced has ended. If not, in step 306 the program waits to determine whether there is any user input. If there is no user input, the program determines in step 308 whether a music note should occur. If a music note should occur, the program starts input counter in step 310 and checks in step 312 whether there is any user input. If there still is no user input, the program determines in step 314 whether the maximum waiting tuition has expired. If yes, the program prompts a signal in step 316 to indicate that no input has been received from the user. The program may either end here in step 398 or go back to step 302 to start a new process to give the user another opportunity.

If in step 304 the program has decided that the song has ended, it proceeds to step 322 in FIG. 11B to start a process of determining optimum music note match lineup and a subsequent evaluation process. These processes will be further described below in relation to FIG. 11B.

Referring now still to FIG. 11A, if in step 306 there is a user input, the program proceeds to step 320 in which the program determines whether the user input has ended. If not, the program stays in step 320 to increase the music note counter. If the user input has ended, the program proceeds to step 344 in FIG. 11C to start a process of recording the music note played by the user. The recording process is further described below in relation to FIG. 11C.

Referring still to FIG. 11A, if in step 308 the program decides that a note should not occur, it goes back to step 304. If in step 312 there is a user input, the program proceeds to step 318 to reset input counter and then proceeds to step 320. The process after step 320 is further described below in relation to FIG. 11C.

If in step 314 the program decides that the maximum waiting duration has not ended, it goes back to step 312 to increase the input counter.

Referring now to FIG. 11B, in step 322 the program determines an optimum music note match lineup for all input musical notes. This determination is made by comparing the value of the error scores of multiple alternative music note match lineups and selects the optimum lineup which has the lowest ever score. This evaluation method has been described above in detail.

In step 324, the program determines whether the music played is just a segment or a complete music score (e.g., a song). If it is not only a segment but a complete song, the process proceeds to step 326 were the program calculates overall and segment error rates (deviations) of all the musical notes played. In step 328, the program determines whether the overall error rate is below the threshold. If the overall error rate is not below the threshold, the program formulates evaluation data which indicate the segments that have an error rate higher than the threshold. In step 332, the program then shows segment errors and points out these errors to the user. In this step, the program also asks the user to replay the segments that have a high error rate. The program may either end in step 398 or start a new process to give the user another opportunity.

If in step 324 the program has determined that the music played is only a segment instead of a complete song, the process proceeds to step 334 to calculate an error rate for the segment played. In step 336, the program determines whether the error rate of the segment is below the threshold. If the error rate of the segment is below the threshold, in step 338 the program shows a signal "segment passed" and asks the user to play another segment which the user has either not played or have not played satisfactorily. If all the individual segments have been passed, the program also asks the user to play the whole song. After proper user input and selections, the program may go back to step 302 (FIG. 11A) to repeat the process for another segment. If in step 336 it is determined that the error rate of the segment is not below the threshold, the program points out in step 340 the errors occurred and asks the user to play again. Depending on the user selection, the program may either go back to step 302 (FIG. 11A), or end in step 398.

If in step 328 the program decides that the overall error rates (deviations) are below the threshold, it proceeds to step 342 to show a "song passed" signal. The program then ends in step 398.

Referring now to FIG. 11C which is a continuation from FIG. 11A, in step 344 the program records the music note data for the music notes played by the user. The data may characterize several attributes of each music note, including pitch (frequency), duration and amplitude. In step 346 the program determines whether the notes played are the first few music bars to the skipped. If yes, the program goes back to step 304 to record subsequent music notes. If the note should not be skipped, the program proceeds to step 348 to make an increment of +1 to the music note counter.

In step 350, the program determines whether the music note counter reaches a threshold. The threshold is set to define a segment of a music score to be practiced by the user. Such segments may either be predefined by the program or customer defined by the user. If the counter has not reached the threshold, the program goes back to step 304 (FIG. 11A) to continue the process for subsequent music notes. If the counter reaches the threshold, the program resets the music note counter in step 352.

The program then proceeds to step 354, in which the program determines an optimum music note match lineup for newly input group of music notes by calculating and comparing error rates (deviations) of alternative music note match lineups. The method for this determination has been described in detail herein. In step 356, the program evaluates the error rate of the music note group (which belongs to a segment of the music to be practiced) against a standard, and determines in step 358 whether the error rate is below a threshold according to the standard. If yes, the program goes back to step 304 to continue the process for another music segment to be practiced. If the error rate is not below a threshold, the program shows in step 360a signal "critical error occurred". The program may also point out the errors to the user and ask the user to play again. Depending on the user input, the program may either go back to step 302 (FIG. 11A) to start over, or ends in step 398.

In addition to checking and evaluating the performance of the music instrument player, the present invention may also be used to instruct the user how to play a music score or a music segment having a group of music notes.

Figure 12A:
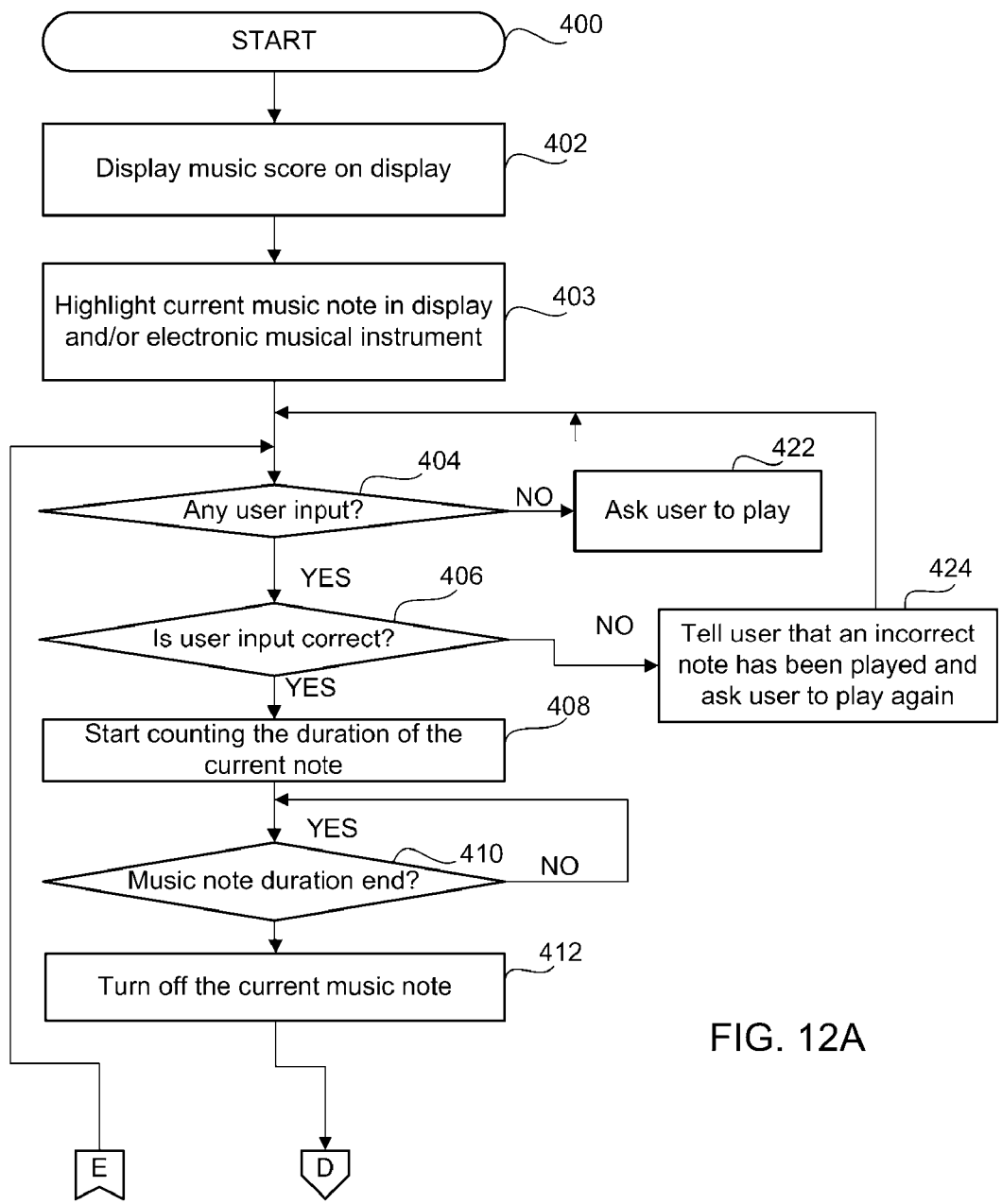
FIGS. 12A and 12B together are a flow chart of a procedure instructing the user how to play a music score (or a segment thereof) using the musical instrument education system in an exemplary embodiment.
Figure 12B:
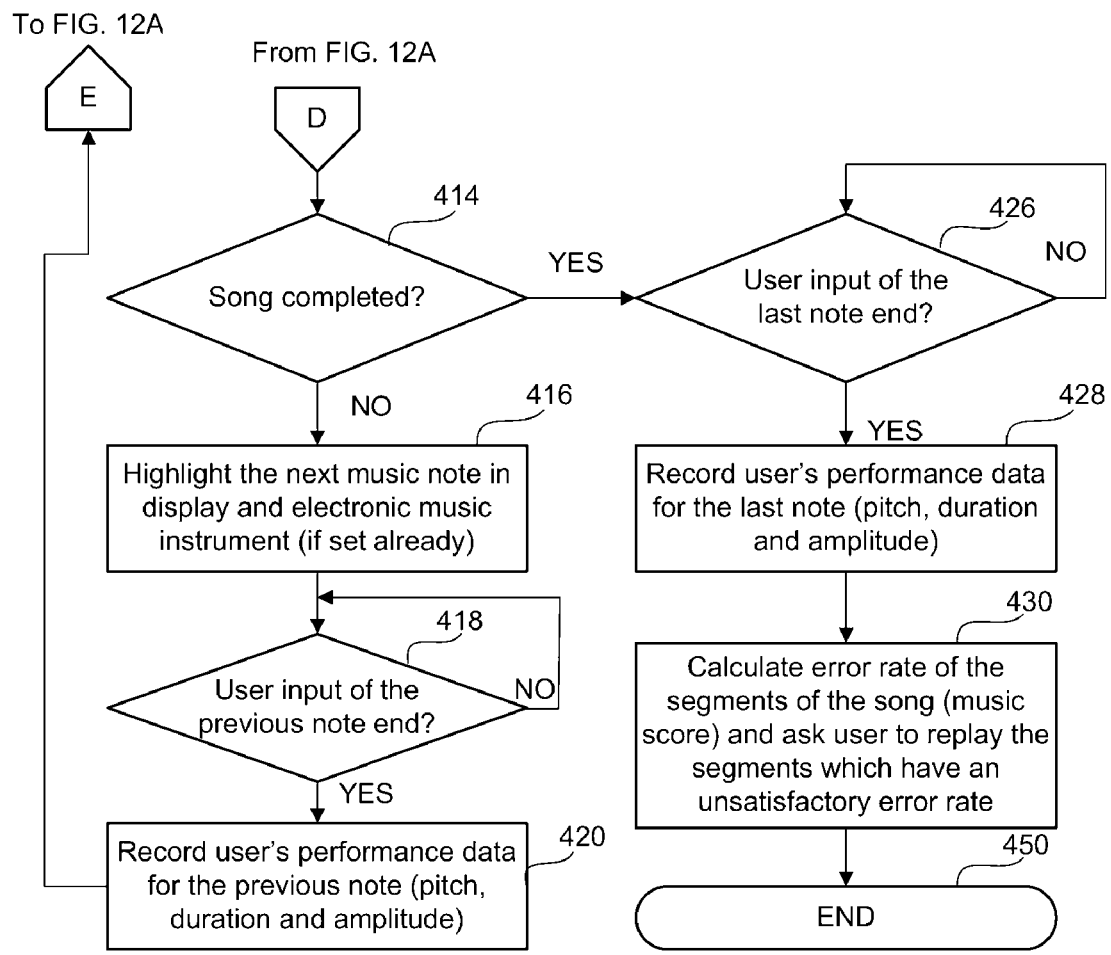

FIGS. 12A and 12B together are a flowchart of a procedure instructing the user how to play a music score (or a segment thereof) using the musical instrument education system in an exemplary embodiment. The process starts in step 400. In this step, the user may adjust the musical instrument 10 and set it to a teaching note. In step 402, the program displays the music score on the display device 25 of the local lesson terminal 12. The music may be displayed in standard music notations. In step 403, program highlights the current music note to be played. The highlighting can be done on the display device 25 where the music notes are displayed. For example, the current music note to be played can be highlighted using a bright color that is different from the color of the rest of the music notes normally displayed, or the current music note to be played may be highlighted using a blinking light. Alternatively or additionally, the current music note to be played may be highlighted on the feedback device 108 of the musical instrument 10 if the music instrument 10 is adapted and set to perform such a task. For example, using the electronic violin 120, the LED of one of the press buttons 132 may be lit up to indicate that the user should press that press buttons to play the current music note.

In step 404, the program waits for a user input. If there is no user input, the program asks the user in step 422 to play and goes back to step 404 to wait for a user input. If the program receives a user input, it proceeds to step 406 to determine whether the received user input is correct. If the user input is incorrect, the program tells the user in step 424 that an incorrect note has been played and asks the user to play again. If the user input is correct, the program proceeds to step 408 to start counting the duration of the current note. In step 410, the program determines whether the music note duration has ended. If the music note duration has not ended, the program stays in step 410 and waits for another increment of time. If the music note duration has ended, the program turns off the current music note in step 412 and proceeds to step 414 in FIG. 12B.

Referring to FIG. 12B, in step 414 the program determines whether the music score (e.g., a song) has been completed. If the music score has not been completed, the program proceeds to step 416 to highlight the next music note to be played. At the same time, in step 418 the program determines whether the user input of the previous note (i.e., the note immediately preceding the new note that has been turned on in step 416) has ended. If not, the program stays in step 418 to wait for an increment of time. After the user input has ended, the program proceeds to step 420 to record the user's performance data for the previous note, including the data for pitch (frequency), duration and amplitude. After this, the program goes back to step 404 in FIG. 12A to start the process for the next music note.

In step 414, if the program determines that the music score (e.g., a song) has been completed, it proceeds to step 426 to determine whether the user input of the last note has ended. If the lost note has not ended, the program stays in step 426 to wait for another increment of time. After the user input has ended, the program proceeds to step 428 to record the user's performance data for the last note, including the data for pitch (frequency), duration and amplitude. After this, the program proceeds to step 430 to calculate the error rates of the segments of the music score and asks the user to replay the segments which have an unsatisfactory error rate. Depending on the user selection, the program may either go back to step 400 to start all over again or end in step 450.

It is appreciated that some steps described above, such as the steps of downloading music materials from a lesson database server, are readily modified according to the embodiments of the musical instrument system used. For example, if the music instrument system uses a receiving port (such as a slot for cartridge) as a data-receiving unit, and a removable data storage (such as a cartridge) as an external music data source, the music materials will correspondingly be supplied by a removable data storage.

It is also appreciated that the disclosed systems and methods for music education can be used for teaching or training a variety of music, including but not limited to classical music, classical songs, pop music, pop songs, and various regional music.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for evaluating musical instrument performance by comparing performance musical data for a plurality of performed musical notes with model musical data for a plurality of model musical notes, the method comprising:
    forming a plurality of alternative musical note match lineups, wherein in each alternative musical note match lineup and each model musical note is matched with one of the performed musical notes to form a pair unless a corresponding performed musical note is missing, and wherein the alternative musical note match lineups are different from one another by at least one pair of matching model musical note and performed musical note;
    for each alternative musical note match lineup, calculating a set of note deviations, each note deviation being calculated from the data for one of the model musical notes and the data for the matching performed musical note; and
    for each alternative musical note match lineup,
        calculating an overall performance deviation of the performance musical data from the model musical data;
        selecting an optimum musical note match lineup from the plurality of musical note match lineups based on the overall performance deviations; and
        evaluating against a preset criterion the overall performance deviation calculated from the optimum musical note match.

2. The method of claim 1 wherein the optimum musical note match lineup results in the smallest overall performance deviation among the plurality of alternative musical note match lineups.

3. The method of claim 1 wherein at least one of the plurality of alternative musical note match lineups allows for an empty match which either has one of the model musical notes unpaired with any of the performed musical notes or has one of the performed musical notes unpaired with any of the model musical notes.

4. The method of claim 1 wherein the performance musical data for each of the plurality of performed musical notes and the model musical data for each of the plurality of model musical notes each comprise values of several musical attributes including frequency, duration, and amplitude.

5. The method of claim 4 wherein each note deviation is calculated using a predetermined formula to combine deviations with respect to the several musical attributes.

* * * * *